US005199860A

United States Patent [19]

Stegmaier

[11] Patent Number: 5,199,860
[45] Date of Patent: Apr. 6, 1993

[54] HYDRAULIC RECIPROCATING PISTON PUMP FOR BRAKE INSTALLATIONS OF MOTOR VEHICLES WITH AN ABS SYSTEM

[75] Inventor: Alwin Stegmaier, Charleston, S.C.

[73] Assignee: Robert Bosch GmbH, Stuttgart, Fed. Rep. of Germany

[21] Appl. No.: 819,738

[22] Filed: Jan. 13, 1992

[30] Foreign Application Priority Data

Jan. 31, 1991 [DE] Fed. Rep. of Germany ....... 4102803

[51] Int. Cl.[5] .............................................. F04B 21/04
[52] U.S. Cl. .................................... 417/566; 417/569; 137/533.17
[58] Field of Search ..................... 417/566, 569, 570; 137/516.15, 533.17

[56] References Cited

U.S. PATENT DOCUMENTS

| 14,893 | 5/1856 | Waterman | 137/516.15 |
| 1,488,683 | 4/1924 | Juruick | 417/570 |
| 4,246,932 | 1/1981 | Raines | 417/566 |
| 4,284,391 | 8/1981 | Williamson | 417/569 |
| 4,861,116 | 8/1989 | Stegmaier | 303/100 |
| 5,067,881 | 11/1991 | Maeharg | 417/554 |

FOREIGN PATENT DOCUMENTS

| 1655383 | 3/1972 | Fed. Rep. of Germany . |
| 3236536 | 4/1984 | Fed. Rep. of Germany . |
| 3341220 | 5/1984 | Fed. Rep. of Germany . |
| 3722988 | 1/1989 | Fed. Rep. of Germany . |

Primary Examiner—Richard A. Bertsch
Assistant Examiner—Charles G. Freay
Attorney, Agent, or Firm—Edwin E. Greigg; Ronald E. Greigg

[57] ABSTRACT

An improve the pump including a reciprocal piston pump having a pump piston, guided longitudinally displaceable in a displacement chamber. An outlet valve for the admission of pressure means and a valve for the outflow of pressure means is associated with the displacement chamber. The outlet valve is embodied as a cup-shaped sleeve, having on the outflow side a sealing lip of an elastomeric material, which cooperates with a cylindrical sealing face. The outlet valve is distinguished by low opening pressure, reduced noise when closing and reduced machining effort. The reciprocating piston pump (10) is intended for use in hydraulic brake installations of motor vehicles with ABS systems.

2 Claims, 2 Drawing Sheets

HYDRAULIC RECIPROCATING PISTON PUMP FOR BRAKE INSTALLATIONS OF MOTOR VEHICLES WITH AN ABS SYSTEM

BACKGROUND OF THE INVENTION

The invention relates to a hydraulic piston pump as set forth hereinafter.

Such reciprocating piston pumps for generating a relatively high pressure are already known from German Published, Non-Examined Patent Application DE-OS 32 36 536. During operation in the ABS system mode, a pump of this type is intended to return pressure medium taken from a wheel brake cylinder during a brake pressure reduction phase back to the main brake cylinder of a brake installation of a motor vehicle with an ABS system, such as known from U.S. Pat. No. 4,861,116. Pump pressures of up to approximately 200 bar can occur in the course of this operation. The reciprocating piston pump has an inlet valve and an outlet valve in the form of one-way valves. These valves have a conical valve seat of great precision and a hardened steel ball as a closing body, which is pressed against the valve seat by means of a helical pressure spring. While a spring with a relatively low closing force is assigned to the inlet valve, the outlet valve has a spring with a great closing force in order to diminish the bounce of the ball, which causes noise during closing of the valve.

Furthermore, very high demands are made on the tightness of particularly the outlet valve in order to prevent, on the one hand, the flow-off of pressure medium from the brake line into a pressure medium reservoir disposed at the inlet side of the pump during braking. The reservoir is intended for the intermediate storage of a pressure medium during the pressure reduction phases in the course of ABS operation, so that it can be transported by the pump. On the other hand, the tightness of the valves also prevents the automatic emptying of the pressure medium reservoir into the main brake cylinder, if during braking without ABS operation, pressure medium is incorrectly collected in the reservoir. However, this disrupts quick brake pressure reduction in the course of an anti-blocking operation.

OBJECT AND SUMMARY OF THE INVENTION

In contrast to the above, the reciprocating piston pump has an advantage that the outlet valve allows lower opening pressure and, if the operational pressure of a pressure medium reservoir provided at the inlet is higher than the opening pressure of the inlet valve as well as the outlet valve of the pump, automatic emptying of the incorrectly filled reservoir via the pump to the main brake cylinder of the brake installation. Furthermore, the operating noise of the reciprocating piston pump is considerably reduced by use of a sleeve as the resilient closing member of the outlet valve. Finally, the sure sealing of the outlet valve can be achieved with less effort in connection with the machining of the sealing face forming the valve seat, because the sealing lip can compensate for tolerances.

Advantageous further embodiments and improvements of the reciprocating piston pump recited in the main claim are possible by means of the steps described herein.

The embodiment of the reciporating piston pump recited is primarily used to support the cup sleeve, which is subjected to the pressure medium flow fed in pulses and is therefore subjected to great stresses, mechanically as well as to protect it from damage, in particular in the opening position and the closing position. Additionally, the pressure medium flow is steered through the annular gap between the sealing face and the sealing lip.

An axially directed flow to the sealing lip and thus reduced flow-through resistance is achieved by means of the further embodiment of the reciprocal piston pump.

The invention will be better understood and further objects and advantages thereof will become more apparent from the ensuing detailed description of a preferred embodiment taken in conjunction with the drawings.

BRIEF DESCRIPTION OF THE DRAWINGS

The exemplary embodiment of the invention is shown in a simplified form in the drawings.

DESCRIPTION OF THE PREFERRED EMBODIMENT

Figure 1:
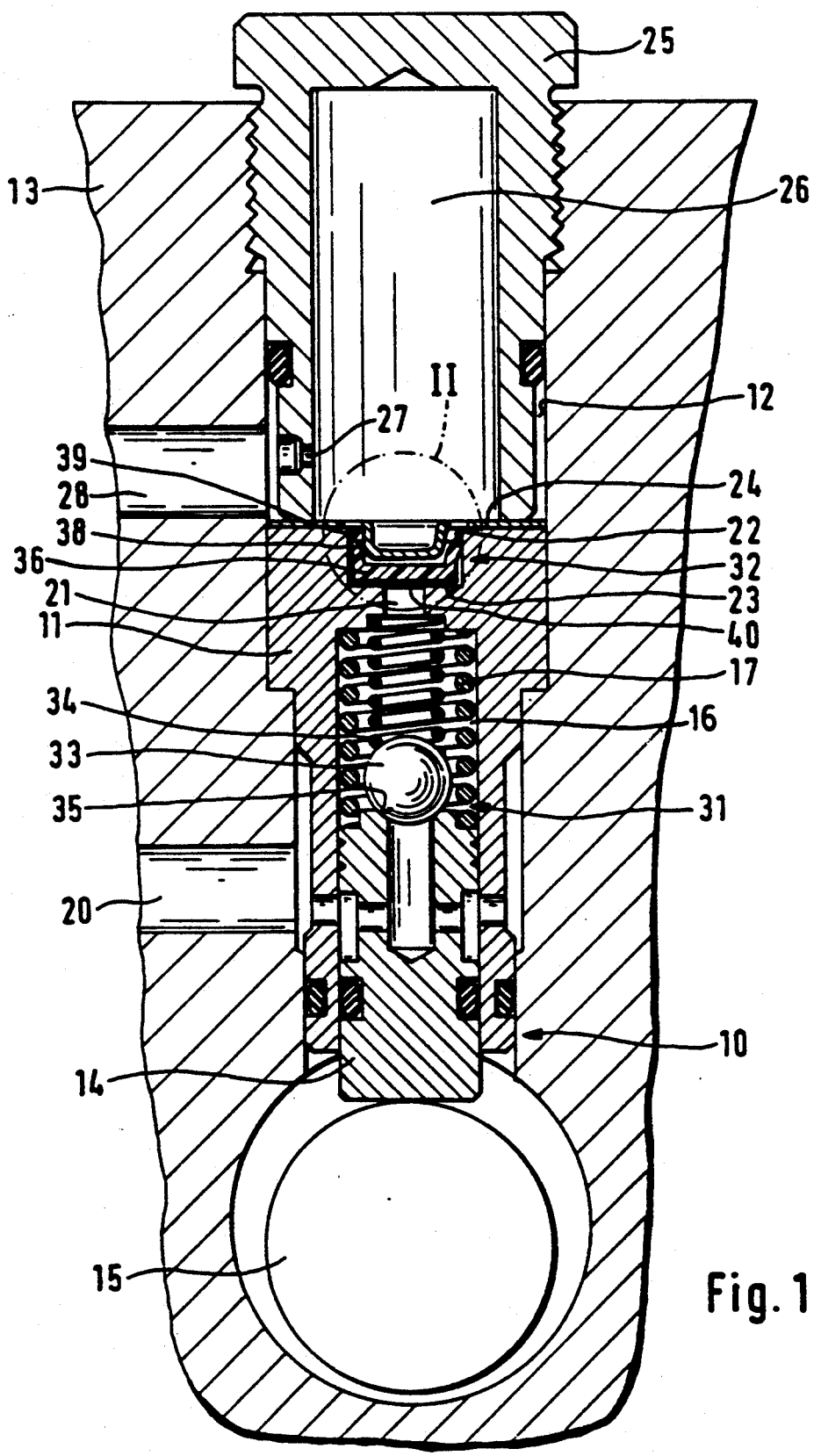
FIG. 1 is a longitudinal section of a hydraulic reciprocating piston pump with a cup sleeve used in the outlet valve.

The hydraulic reciprocating piston pump 10 shown in FIG. 1 has a pump cylinder 11, which is received in a stepped bore 12 of a housing 13. A pump piston 14 is guided in a longitudinally displaceable manner in the pump cylinder 11. The pump piston 14 can be driven by an eccentric 15. The volume of a displacement chamber 16 in the pump cylinder 11 can be changed by means of the longitudinal displacement of the pump piston 14. A restoring spring 17, by means of which the pump piston 14 is supported on the eccentric 15, is disposed in the displacement chamber 16 equiaxially with the pump piston 14.

The displacement chamber 16 is connected with a supply line 20 of the housing 13. A connecting bore 21, extending in axially alignment with the pump cylinder 11, starts at the outlet side of the displacement chamber 16. It terminates on the flow-off side in a cylindrical recess 22 of the pump cylinder 11 and has a bottom 23 extending at right angles in respect to the longitudinal axis of the pump cylinder 11.

A closure screw 25, by means of which the pump cylinder 11 is fixed in the stepped bore 12, follows the pump cylinder 11, with a plate-shaped support body 24 interposed. The closure screw 25 contains a blind bore damping chamber 26, from which a throttle bore 27 extends to a flow-off line 28 of the housing 13.

A valve 31 for the admission of a pressure medium and a valve 32 for the outflow of pressure medium into the damping chamber 26 is associated with the displacement chamber 16 of the pump cylinder 11. The inlet valve 31 opens during the suction stroke of the pump piston 14; during the working stroke, the outlet valve 32 opens the connection from the displacement chamber 16 to the damping chamber 26.

The inlet valve 31 has a ball 33 as a closing member, which is supported on a conical valve seat 35 of the pump piston 14 by the action of a relatively weak closure spring 34 located in the displacement chamber 16.

Figure 2:
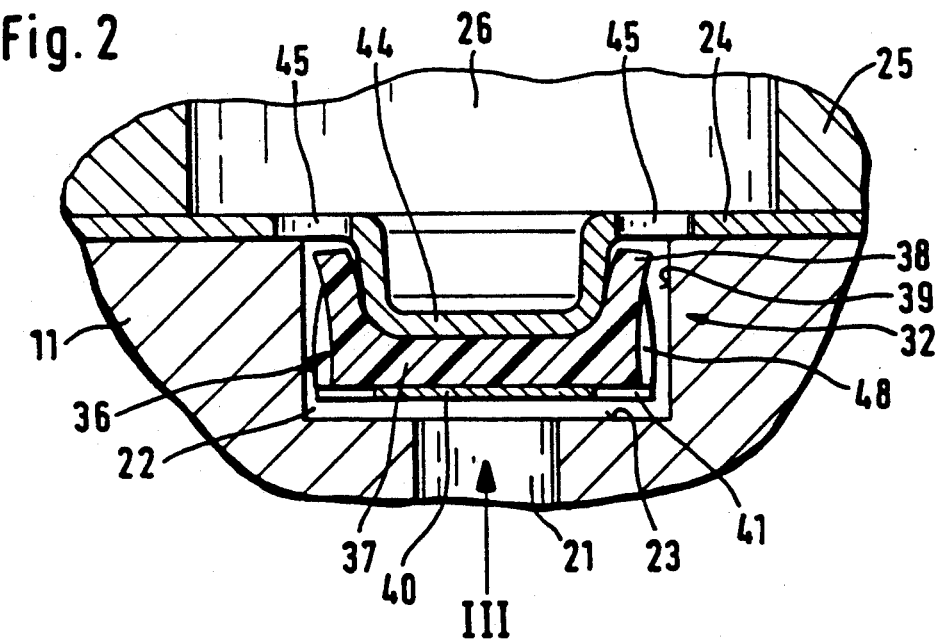
FIG. 2 shows the detail II of FIG. 1, which is the outlet valve assuming its open position, in a different scale.

The outlet valve 32 has a cup sleeve 36 of an elastomeric material for a closing member. The cup sleeve 36 has a disk-shaped body 37 at the peripheral extending axially in respect to the damping chamber 26 (FIG. 2). In the closed position of the outlet valve 32 illustrated in FIG. 1, the sealing lip 38 cooperates with the interior peripheral surface of the recess 22 used as a sealing face 39.

Figure 4:
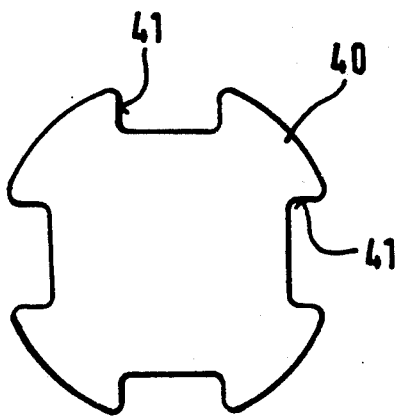
FIG. 4 is a plan view of a disk cooperating with the sleeve on the inflow side, also viewed in the direction of the arrow III of FIG. 2.

On the side of the connecting bore 21, the sleeve 36 is supported by means of its body 37 on a flat disk 40 having nearly the diameter of the recess 22. In the closed position of the outlet valve 32, the disk 40 is seated on the bottom 23 of the recess 22 because of the pressure of the pressure medium contained in the damping chamber 26. The edge of the disk 40 is provided with perforations 41, preferably evenly distributed over the periphery, for the flow-through of the pressure medium (FIG. 4). The perforations 41 may have the shape illustrated; but they may also be formed, for example, in the shape of triangles or circles and in numbers differing from the exemplary embodiment. The disk 40 protects the body 37 of the cup sleeve 36 against wear by the pressure medium which is ejected pulselike from the displacement chamber 16 through the connecting bore 21 in the course of the operation of the reciprocating piston pump 10. Additionally, the disk 40 prevents the body 37 of the sleeve 36 from being pulled into the connecting bore 21 because of the effect of the pressure in the damping chamber 26. For this reason the perforations 41 of the disk 40 end in a radial direction in front of the connecting bore 21.

The support body 24 has a cup-shaped collar 44 extending coaxially in respect to the cylindrical recess 22 and directed towards its bottom 23. This collar 44 is adapted to the interior contour of the cup sleeve 36. A plurality of flow-through openings 45 for the pressure medium, preferably disposed at even distances, is provided adjoining the collar 44. In this case the cross section of the flow-through openings 45 is located predominantly within the cross section of the cylindrical recess 22.

The shape of the cup-shaped collar 44 is such that, with the cup sleeve 36 and the disk 40 inserted in the cylindrical recess 22, axial play for the disk- shaped body 37 and radial play for the sealing lip 39 of the sleeve result. Thus, the sleeve 36 is capable of performing a valve lift from its closed position in FIG. 1 into the open position illustrated in FIG. 2, during which the sleeve nestles with its interior contour against the cup-shaped collar 44 of the support body 24. In this open position the sealing lip 38 has been lifted, making use of the radial play, from the sealing face 39 of the recess 22.

Figure 3:
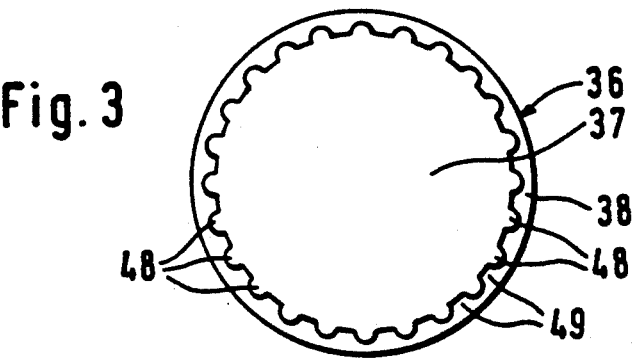
FIG. 3 is a view of the sleeve viewed in the direction of the arrow III in FIG. 2.

Pressure medium ejected by the pump piston 14 from the displacement chamber 16 thus flows in an axial direction through the perforations 41 of the disk 40 along the interior periphery of the recess 22. The flow is guided by means of longitudinal ribs 48 of the sleeve 36, which extend in an even distribution along its exterior periphery and end juxtaposed the sealing lip 39, forming flow channels 49 (FIG. 3). The pressure means overcoming the sealing lip 39 enters the damping chamber 26 through the flow- through openings 45 of the support body 24. The support body 24, which limits the lift of the cup sleeve 36, in the open position of the outlet valve 32 receives the flow force of the pressure medium acting on the sleeve 36.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A hydraulic reciprocating piston pump (10) for brake installations of motor vehicles with ABS systems, comprising a pump cylinder, a pump piston (14) operative within said pump cylinder (11), a displacement chamber (16) confined by said piston and said pump cylinder, an axially aligned cylindrical recess (22) in said pump cylinder, an axially aligned connecting bore (21) extending from said pump cylinder to said recess (22), a valve (31) operative in said displacement chamber (16) for admission of a pressure medium from a supply line (20) into said displacement chamber (16), a valve (32) in said recess (22), said valve (32) includes an inflow side and an outflow side, said valve (32) is embodied as a cup sleeve (36) with an axially extending sealing lip (38) of elastomeric material on the outflow side, which cooperates with a cylindrical sealing face (39) formed by an interior periphery of said cylindrical recess, a flat disc (40) having perforations (41) in an outer edge is associated with a bottom (23) of the cylindrical recess (22) which has nearly the same diameter as the cylindrical recess, the cup sleeve (36) has a disk-shaped body (37) which includes a peripheral area which forms the axially extending sealing lip (38), a support body (24), adapted to an interior contour of the cup sleeve (36) maintains axial play for the disk-shaped body (37) and radial play for the sealing lip (38) engages the cylindrical recess (22) on the outflow side of the valve (32) and is provided with at least one flow-through opening (45) on a side towards the sealing lip (38).

2. A hydraulic reciprocating pump in accordance with claim 1, in which the cup sleeve (36) has flow channels (49), extending axially, on an outer periphery from a bottom surface, which end at the sealing lip (38).

* * * * *